US012739203B1

(12) United States Patent
Thulasiram et al.

(10) Patent No.: US 12,739,203 B1
(45) Date of Patent: Sep. 15, 2026

(54) TRANSMISSION OF PACKET FRAGMENTS

(71) Applicant: Juniper Networks, Inc., Sunnyvale, CA (US)

(72) Inventors: AnandaVelu Thulasiram, San Jose, CA (US); Anand Siddappa Katti, Bangalore (IN); Bhupesh Bhargava, Bangalore (IN); Abhishek Hariharan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 384 days.

(21) Appl. No.: 18/516,325

(22) Filed: Nov. 21, 2023

(51) Int. Cl.
*H04L 45/745* (2022.01)

(52) U.S. Cl.
CPC .................................. *H04L 45/745* (2013.01)

(58) Field of Classification Search
CPC ..................................................... H04L 45/745
See application file for complete search history.

(56) References Cited

U.S. PATENT DOCUMENTS

2008/0049752 A1* 2/2008 Grant .................. H04L 12/4641 370/392
2009/0110003 A1* 4/2009 Julien ................... H04L 69/166 370/476
2011/0261822 A1* 10/2011 Battestilli ........... H04L 49/3009 370/394
2014/0079076 A1* 3/2014 Kamble .............. H04L 49/9057 370/474
2017/0346726 A1* 11/2017 Menon .................. H04L 45/247
2022/0166709 A1* 5/2022 Barman .................. H04L 45/38
2023/0336480 A1* 10/2023 Manickam ............. H04L 47/43

OTHER PUBLICATIONS

"Flow-Based and Packet-Based Processing User Guide for Security Devices." Junos OS; Juniper Networks | Engineering Simplicity; Jun. 15, 2023; 933 pages.

* cited by examiner

*Primary Examiner* — Duc C Ho
(74) *Attorney, Agent, or Firm* — Harrity & Harrity, LLP

(57) ABSTRACT

In some implementations, a network device may receive fragments of a packet. The network device may perform, while the fragments are stored in an input/output (I/O) card of the network device, a lookup for a flow-based session associated with the fragments. The network device may transmit the fragments based on the lookup.

20 Claims, 9 Drawing Sheets

700
710
Receive, by a network device, fragments of a packet
720
Perform, by the network device, while the fragments are stored in an input/output (I/O) card of the network device, a lookup for a flow-based session associated with the fragments
730
Transmit, by the network device, the fragments based on the lookup

TRANSMISSION OF PACKET FRAGMENTS

BACKGROUND

In distributed networking, network traffic is segregated into control plane traffic and data plane traffic to support increasing demand for finer control and scaling requirements. Network devices may employ dedicated processors to efficiently process these different categories of traffic. For example, a network device may include a control plane component and a data plane (or forwarding plane) component, among other components. The control plane component may be responsible for populating a routing information base (RIB) for processing packets received at the network device, populating a forwarding information base (FIB) based on information included in the RIB, participating in one or more routing protocols, and/or the like. The data plane component may receive the packets, forward the packets based on the information included in the RIB and/or the information included in the FIB, and/or the like.

SUMMARY

Some implementations described herein relate to a method. The method may include receiving, by a network device, fragments of a packet. The method may include performing, by the network device, while the fragments are stored in an input/output (I/O) card of the network device, a lookup for a flow-based session associated with the fragments. The method may include transmitting, by the network device, the fragments based on the lookup.

Some implementations described herein relate to a network device. The network device may include one or more memories and one or more processors. The one or more processors may be to receive fragments of a packet. The one or more processors may be to determine, based on a packet-specific tuple associated with each of the fragments, that the fragments are of the packet. The one or more processors may be to transmit the fragments based on the fragments being of the packet.

Some implementations described herein relate to a non-transitory computer-readable medium that stores a set of instructions. The set of instructions, when executed by one or more processors of a network device, may cause the network device to receive fragments of a packet. The set of instructions, when executed by one or more processors of the network device, may cause the network device to determine, based on a packet-specific tuple associated with each of the fragments, that the fragments are of the packet. The set of instructions, when executed by one or more processors of the network device, may cause the network device to perform, based on the fragments being of the packet, while the fragments are stored in an I/O card of the network device, a lookup for a flow-based session associated with the fragments. The set of instructions, when executed by one or more processors of the network device, may cause the network device to transmit the fragments based on the lookup.

DETAILED DESCRIPTION

Figure 1:
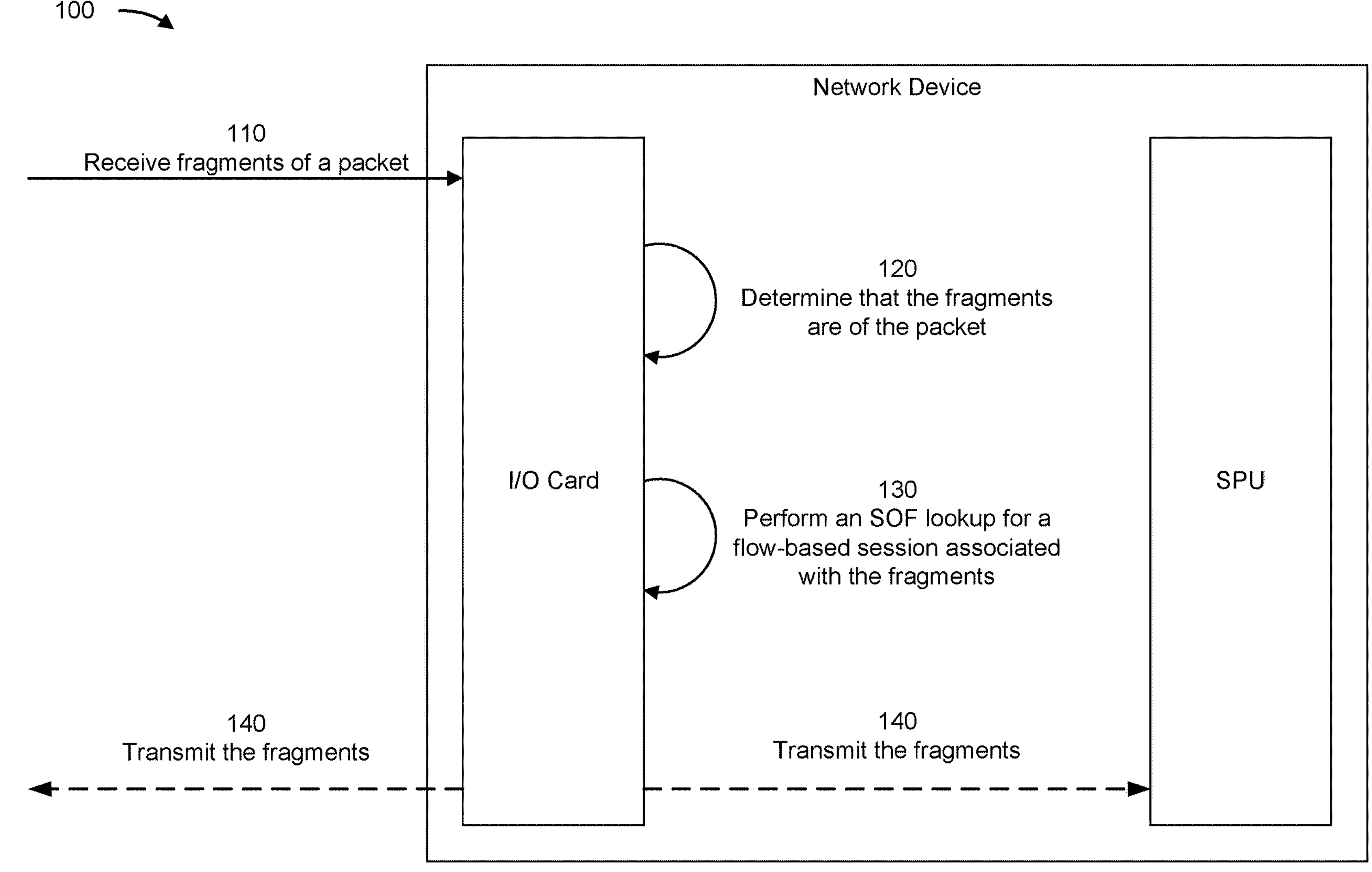
FIG. 1 is a diagram of an example implementation associated with transmission of packet fragments.

The following detailed description of example implementations refers to the accompanying drawings. The same reference numbers in different drawings may identify the same or similar elements.

A network device (e.g., a firewall, a router, a switch, or other networking equipment) may include one or more I/O cards (e.g., application-specific integrated circuit (ASICs)) and one or more data plane threads, which may be referred to as services processing units (SPUs). The I/O cards and/or SPUs may be used to forward data plane traffic using a fast path mechanism or an express path mechanism, which may also be referred to as a services offloading (SOF) mechanism.

The fast path mechanism may enable the network device to forward data plane traffic using a data plane traffic processing path, which may be referred to as a hardware fast path. Using the fast path mechanism, the SPU may fetch a packet received at an I/O card and check a session table for a flow-based session for the packet. The flow-based session, which may be referred to as a flow session, may be uniquely identified by a five-tuple of the packet. The five-tuple may include a source internet protocol (IP) address of the packet, a destination IP address of the packet, a protocol of the packet, a source port of the packet, and a destination port of the packet. If no established flow session is found for the packet (e.g., if the packet is the first packet of a flow), then one of the SPUs of the network device may handle the packet and install a flow session. For example, the SPU may apply flow-based security features to the packet based on the established flow session, prepare the packet for forwarding, and forward the packet through the I/O card for transmission. The fast path mechanism involves some packet-processing latency because packets are forwarded from the I/O card (e.g., one or more network processors, and/or a network processing unit (NPU), on the I/O card) to the SPU for processing and then back to the I/O card for transmission.

The express path mechanism may enable the network device to reduce the packet-processing latency associated with the fast path mechanism by processing fast path packets in the I/O card (e.g., a network processor of the I/O card) instead of the SPU. Using the express path mechanism, the I/O card (e.g., an NPU of the I/O card) may extract the five-tuple from an ingress packet, form the hash key from the five-tuple, and check for an SOF session based on the hash key. If the SOF session has not been installed on the I/O card (e.g., if the ingress packet is the first packet of a flow), then the I/O card may forward the ingress packet to an SPU. The SPU may process the packet, establish an SOF session corresponding to the flow, and determine, based on certain criteria, whether the session is suitable for offloading from the SPU to the I/O card. For example, the SPU may determine whether the flow qualifies for express path processing. If the SOF session is suitable for offloading, then the SPU may install the SOF session on the I/O card (e.g., on an NPU of the I/O card). For example, the SPU may create a session entry in a network processor flow table of the I/O card. After the SOF session has been installed on the I/O card, the I/O card may process subsequent packets of the flow in the network processor (e.g., without forwarding the packets to the SPU). For example, the I/O card (e.g., an NPU of the I/O card) may extract the five-tuple from an ingress packet, form the hash key from the five-tuple, and check for an SOF session based on the hash key. If the SOF session has been established on the I/O card (e.g., if the ingress packet is a subsequent packet of a flow), then the I/O card may offload the operations that would otherwise be performed by the SPU using the fast path mechanism.

In some cases, a network device using the express path mechanism can receive mixed network traffic. The network traffic may be "mixed" in that frames belonging to an SOF session may include fragmented frame and full-sized frames. Because only the first fragment of a packet contains all five pieces of information in the five-tuple, the I/O card (e.g., NPU) cannot extract the five tuples from the subsequent fragments of a packet, and, thus, cannot identify the SOF session for the packet, even if the SOF session has been installed on the I/O card. As a result, the network device may implement a procedure whereby the I/O card sends all of the packet fragments to the SPU, which stores, reassembles, and loops-back the reassembled packet to the I/O card (e.g., the NPU) to extract the five tuples and identify the SOF session. This procedure prevents processing from occurring on the hardware express path and introduces significant delay.

This procedure may also cause packets to be delivered out-of-order. For example, the network device may receive a packet stream for an SOF session that has been established on the I/O card. For example, the packet stream may include a fragmented packet P1 having three fragments f1P1, f2P1, f3P1 and a non-fragmented packet P2. The network device may receive f1P1, then f2P1, then f3P1, and then P2. Because P1 is fragmented, the I/O card (e.g., NPU) forwards f1P1, f2P1, and f3P1 to the SPU for processing (e.g., de-fragmentation and reassembly of f1P1, f2P1, and f3P1). While the SPU is processing f1P1, f2P1, and f3P1, the I/O card (e.g., the NPU) receives P2, matches P2 with the installed SOF session, and is offloaded (e.g., forwarded) before f1P1, f2P1, and f3P1. Thus, although the network device received the packets in order (e.g., because the network device received P2 after the fragments of P1), the network device delivers the packets out of order (e.g., because the network device forwards P2 before forwarding the fragments of P1).

The network device may delete an installed SOF session in response to receiving a fragmented packet, which may prevent the I/O card from forwarding subsequent packets based on the SOF session, thereby avoiding out-of-order delivery. However, because a significant percentage (e.g., 30-40%) of network traffic may be fragmented, deleting an installed SOF session can decrease throughput drastically. As a result, mixed network (e.g., input) traffic may create sudden drops in throughput. For example, the SPU reassembling the packets can decrease the overall system throughput and cause the I/O card (e.g., NPU) to go underutilized. Furthermore, repeatedly adding and deleting SOF sessions may involve significant quantities of SPU cycles and utilizations, consume considerable central processing unit (CPU) cycles, and lead to race conditions (e.g., where one hash walker thread is adding an SOF session entry and another hash walker thread is deleting the same SOF session entry), particularly in cases where the network device frequently receives both fragmented and non-fragmented packets for a single SOF session. In addition, storing all of the fragments of a packet before starting processing of the fragments consumes excessive memory. Moreover, the fragments can traverse multiple hops in the SPU, which can lead to additional delay in reassembly. For example, because the I/O card may extract only limited pieces of information of the five-tuple from fragments, the I/O card may transmit fragments to an incorrect services processing card (SPC) of the SPU. As a result, the SPU may forward fragments from the incorrect SPC to the correct SPC, which may introduce additional hops compared to the fragments being forwarded from the I/O card directly to the correct SPC.

Some implementations described herein enable offloading of fragmented traffic without reassembly. In some examples, rather than de-fragmenting and reassembling all of the fragments in an SPU, a network processor (e.g., in the I/O card) may buffer all of the fragments in on-chip memory. For example, the network device may identify all of the fragments belonging to a unique packet by a four-tuple, calculate a hash based on the four-tuple, and store all of the fragments of the packet in on-chip memory of an NPU (e.g., in the I/O card). The network device may validate and reorder all of the fragments of the packet in a time-bound manner, and if the fragments cannot be properly validated, then the network device may drop all of the received fragments.

The network device may form a hash key using a five-tuple present in the initial fragment and evaluate the SOF session of the fragmented packet based on the five-tuple. The network device may run an SOF check and, if the SOF session is installed on the I/O card, forward all packets out. For example, when the SOF session information is available, the network device may send all of the fragments out to a wide area network (WAN) based on the matching SOF session. If the SOF session is not installed on the I/O card, then the network device may send all of the fragments of the packet to the SPU for further processing. The network device may further delete the hash entry created earlier for storing fragments of the packet.

As a result, the network device may prevent out-of-order delivery (because all processing may occur within an NPU of the I/O card) without deleting installed SOF sessions or reassembling the fragments into a packet, thereby enabling high system throughput. Further, CPU cycles that would otherwise be allocated for reassembly and further fragmentation may be conserved. For example, CPU cycles may be conserved in cases where the egress interface maximum transmission unit (MTU) is configured to be less than the full packet size.

FIG. 1 is a diagram of an example implementation 100 associated with transmission of packet fragments. As shown in FIG. 1, example implementation 100 includes a network device, which is described in more detail below in connection with FIGS. 4-6.

As shown by reference number 110, the network device may receive fragments of a packet. For example, an I/O card of the network device may receive the fragments from another network device or the like. For example, the network device may receive the fragments via a port of the I/O card.

As shown by reference number 120, the network device may determine that the fragments are of the packet. For example, the network device (e.g., the I/O card) may determine that the fragments belong to the same packet. In some aspects, the network device may determine that the fragments are of the packet based on a packet-specific tuple associated with each of the fragments. For example, the I/O card may identify all of the fragments belonging to a unique packet by the packet-specific tuple. The packet-specific tuple may be a tuple that uniquely identifies the packet and may contain information that the I/O card can extract from each fragment. In some examples, the packet-specific tuple for each fragment may include a source internet protocol (IP) address, a destination IP address, an IP identification, and a virtual routing and forwarding (VRF) indication. Thus, in some examples, the packet-specific tuple may be a four-tuple.

In some aspects, the network device (e.g., the I/O card) may store a hash entry based on the packet-specific tuple (e.g., the hash may be packet-specific). In some examples, the network device may calculate a hash based on the packet-specific tuple (e.g., the four-tuple) and store the hash entry based on the hash. The network device may determine that the fragments are of the packet based on the hash entry. For example, the network device may determine that the fragments are of the same packet based on the fragments having matching hashes and/or hash entries (e.g., based on the fragments having the same packet-specific tuple).

In some examples, the network device may store the fragments in the I/O card. For example, a network processor may store the fragments (e.g., all of the fragments of the packet) in on-chip memory. For example, the network device may store all of the fragments of the packet in on-chip memory of an NPU of the I/O card.

As shown by reference number 130, the network device may perform a lookup (e.g., an SOF lookup) for a flow-based session (e.g., an SOF session) associated with the fragments. For example, the network device may run an SOF check (e.g., by determining whether an SOF session for the flow that the packet belongs to has been installed on the I/O card). In some examples, the network device may perform the lookup while the fragments are stored in the I/O card (e.g., rather than the I/O card forwarding the fragments to the SPU for de-fragmentation and reassembly). In some examples, the network device may perform the lookup based on the fragments being of the packet. For example, the network device may perform the lookup for the flow-based session associated with the fragments in response to determining that the fragments belong to the same packet (e.g., the lookup may apply to all of the fragments).

In some aspects, the network device may determine that the fragments are associated with the flow-based session. For example, the network device may determine that the SPU has installed the flow-based session on the I/O card and, therefore, an SOF session can be evaluated. In some aspects, the network device may determine that the fragments are associated with the flow-based session based on a per-flow tuple associated with the packet. For example, the network device may determine that the SOF session can be evaluated based on the five-tuple of the packet. In some aspects, the network device may identify information associated with the flow-based session in an initial (e.g., first) fragment of the fragments. For example, the network device may extract, from the initial fragment, the five-tuple (e.g., the source IP address of the packet, the destination IP address of the packet, the protocol of the packet, the source port of the packet, and the destination port of the packet). The initial fragment may have an offset of zero and a more-fragment bit that is set in a Layer 3 header. In some aspects, the network device may generate a hash based on the per-flow tuple and perform the lookup based on the hash. For example, the network device may form a hash key using the five-tuple present in the initial fragment and look up the hash key to determine whether the SOF session has already been installed on the I/O card.

As shown by reference number 140, the network device may transmit the fragments. In some examples, the network device may transmit the fragments based on the lookup. For example, depending on the result of the lookup, the network device may forward the fragments out of the network device (e.g., toward a WAN) or from the I/O card to the SPU for further processing. In some examples, the network device may transmit the fragments based on the fragments being of the packet. For example, the network device may determine that the fragments belong to the same packet and, thus, are to be transmitted based on the presence or absence of the flow-based session associated with the packet.

In some aspects, the network device may identify the flow-based session and forward the fragments based on the flow-based session. For example, the lookup may reveal that the flow-based session has been installed on the I/O card (e.g., the SOF session information may be available on the I/O card), and the I/O card may forward all of the fragments of the packet. For example, the I/O card may send all of the fragments to the WAN, via a port of the I/O card, based on the five-tuple-based hash extracted from the initial fragment matching a hash of the installed SOF session. In other aspects, the network device may determine that the flow-based session has not been installed on the I/O card (e.g., the lookup reveals no hash match) and the network device may send all of the fragments to the SPU for further processing.

In some aspects, the network device may perform the lookup based on a time window. In some examples, the network device may receive an initial fragment and any subsequent fragments within the time window (e.g., the time window may begin when the network device receives the initial fragment). In some examples, the time window may restart in response to receiving a fragment of the packet. The time window may be any suitable length of time, such as 20 ms. The network device may validate and reorder the fragments in a time-bound manner. For example, validating the fragments may include determining whether all of the fragments of the packet have been received within the time window, determining whether the network device received duplicate fragments (e.g., two offset-zero fragments), or the like. If the validation is successful, then the network device may forward the fragments. If the validation is unsuccessful, then the network device may drop the fragments.

In some aspects, the network device may delete the hash entry in response to transmitting the fragments. For example, after transmitting the fragments, the network device may delete the hash entry that the network device previously created for storing the fragments of the packet.

Performing the lookup while the fragments are stored in the I/O card may prevent out-of-order delivery (because all processing may occur within an NPU of the I/O card) without deleting installed SOF sessions. The network device may avoid sending fragments between the I/O card and the SPU and/or reassembling the fragments into a packet, thereby enabling high (e.g., multifold-increased) system throughput (e.g., the I/O card may process the fragments at line rate), avoiding race conditions, and/or preventing the fragments from traversing multiple hops in the SPU. Further, SPU cycles and/or CPU cycles that would otherwise be allocated for reassembly and further fragmentation may be conserved. For example, CPU cycles may be conserved in cases where the egress interface MTU is configured to be less than the full packet size (e.g., where an image and a text file are sent over a session). The network device may also begin processing the fragments before storing all of the fragments of the packet, thereby reducing memory constraints.

Determining that the fragments are of the packet may enable the network device to identify the fragments (e.g., fragments that do not contain information for the per-flow tuple) that are associated with a given flow-based session. Deleting the hash entry may create space (e.g., in the on-chip memory of the I/O card) for additional incoming traffic. Performing the lookup based on the time window may help to ensure that the network device enables allocation of resources for operations other than those associated with the fragments after the time window expires.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
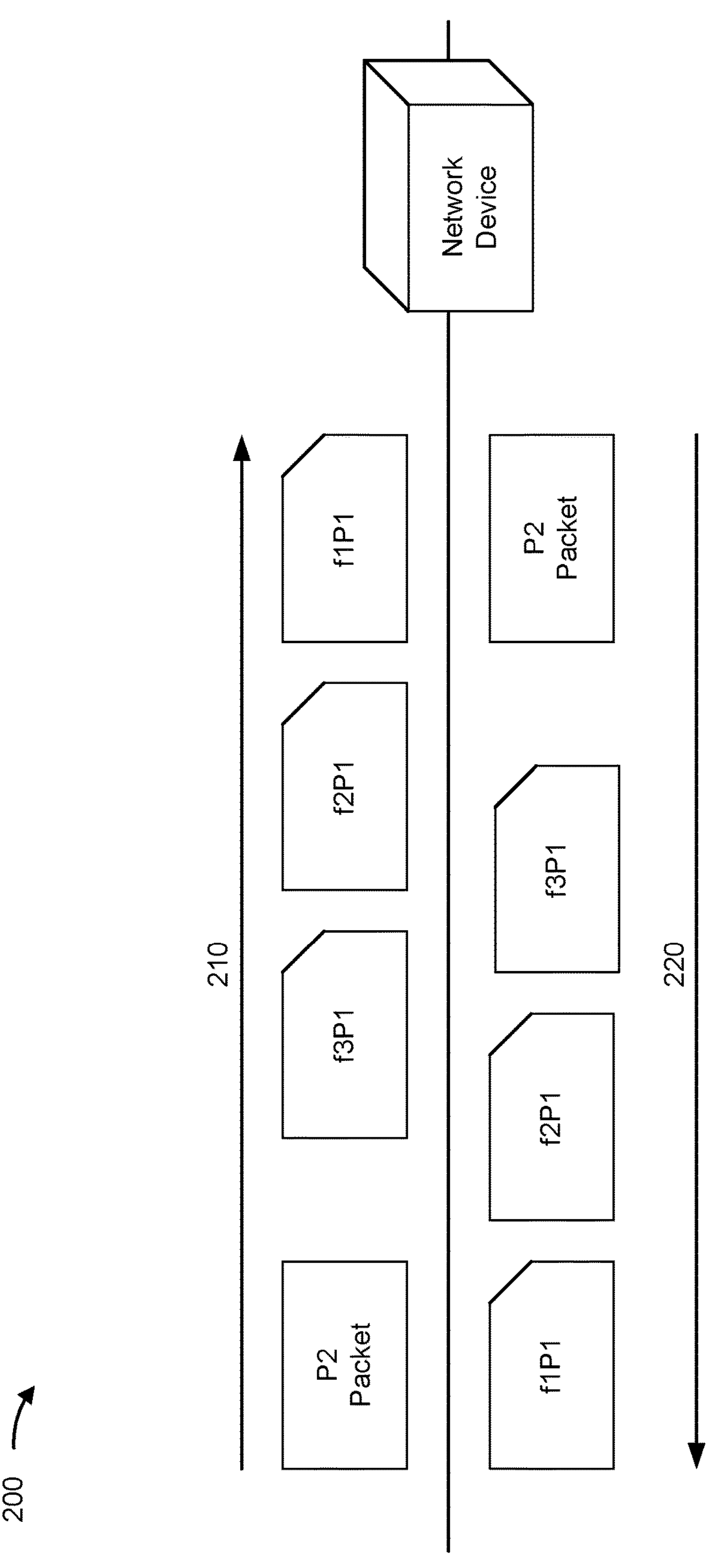
FIG. 2 is a diagram of an example implementation associated with transmission of mixed network traffic.

FIG. 2 is a diagram of an example implementation 200 associated with transmission of mixed network traffic. As shown in FIG. 2, example implementation 200 includes a network device (e.g., the network device of FIG. 1).

As shown by reference number 210, the network device may receive a packet stream for an SOF session that has been established on the I/O card. For example, the packet stream may include a fragmented packet P1 having three fragments f1P1, f2P1, f3P1 and a non-fragmented packet P2. The network device may receive f1P1, then f2P1, then f3P1, and then P2. As shown by reference number 220, rather than forwarding the fragments to the SPU, the network device may process and output f1P1, f2P1, and f3P1 on an I/O card and then process and output P2 on the I/O card. Thus, the network device delivers the network traffic in the order in which the network traffic was received.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3A:
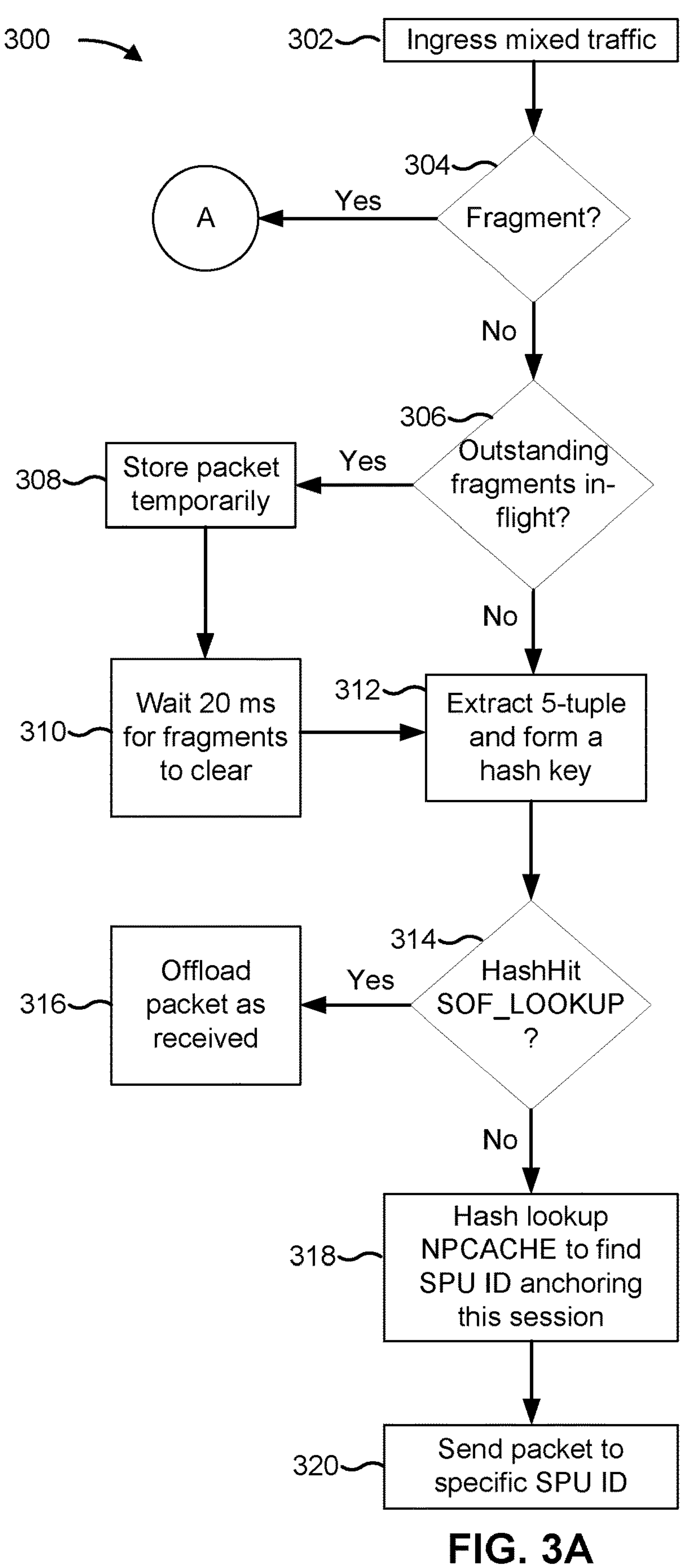
FIGS. 3A-3C are diagrams of an example process associated with transmission of packet fragments.
Figure 3B:
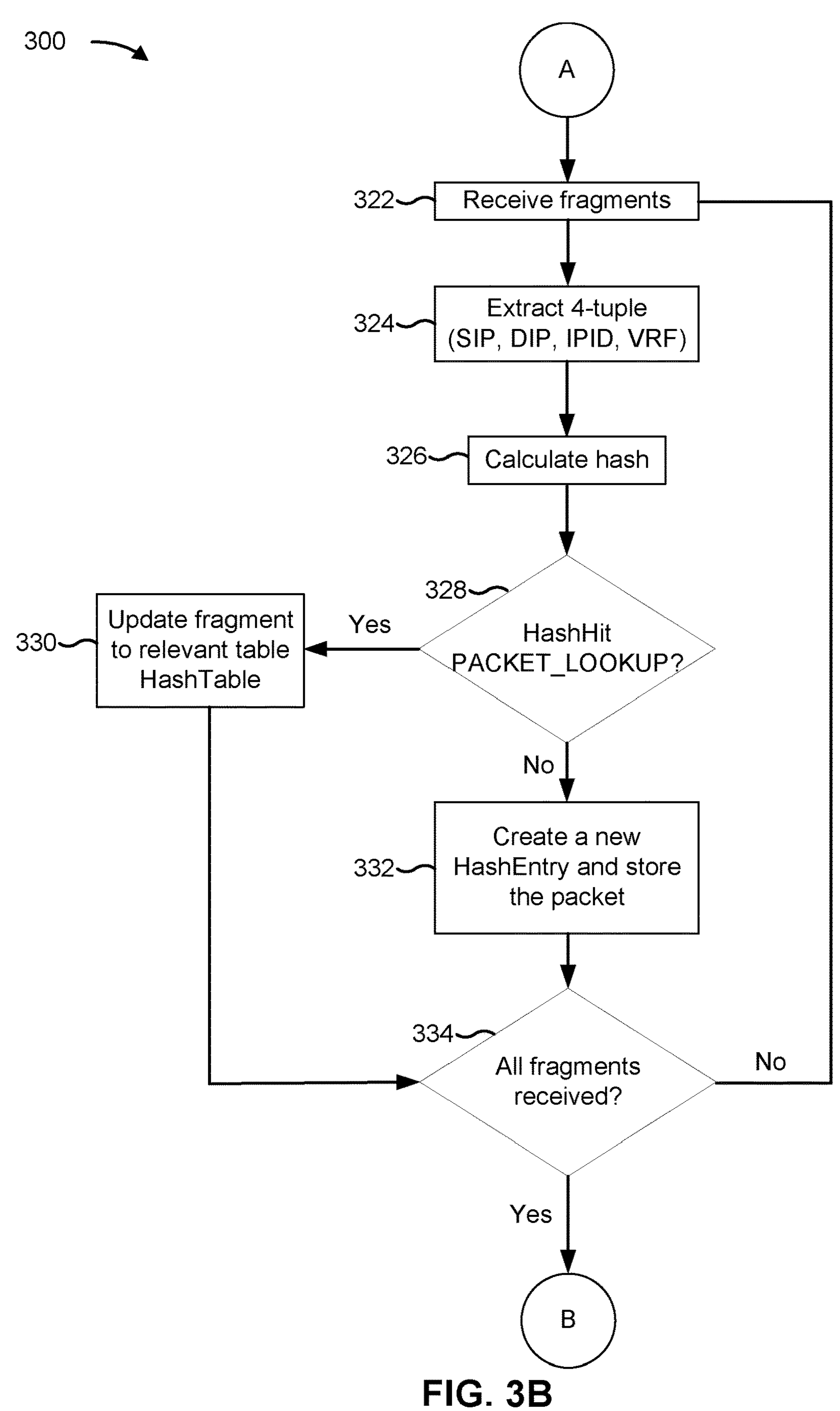
Figure 3C:
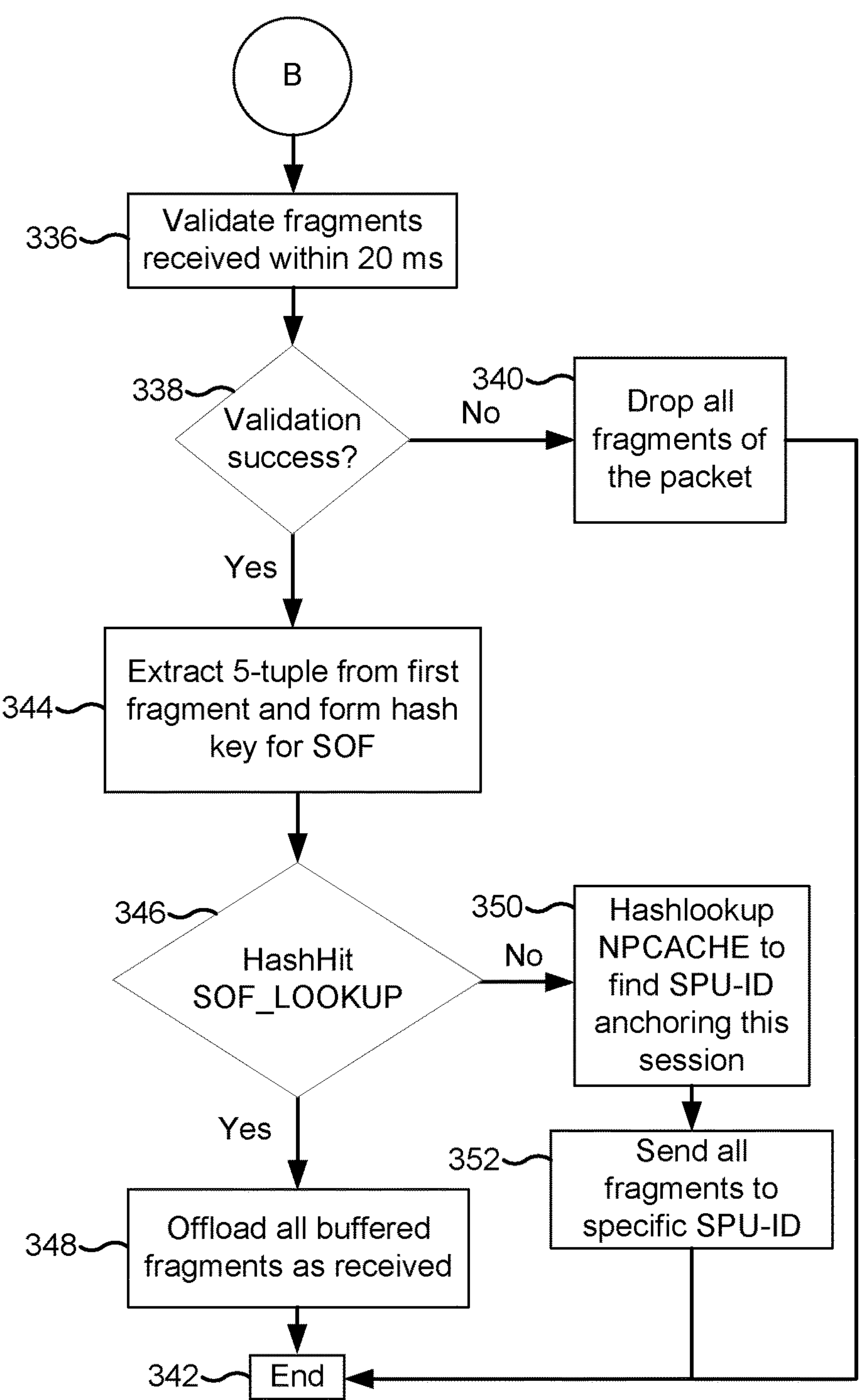

FIGS. 3A-3C are diagrams of an example process 300 associated with transmission of packet fragments. In some implementations, one or more process blocks of FIGS. 3A-3C are performed by a network device and/or an I/O card of the network device (e.g., the network device of FIG. 1).

Turning first to FIG. 3A, as shown by reference number 302, the network device may receive ingress mixed traffic (e.g., a fragment or a packet). As shown by reference number 304, the network device may determine whether the received traffic is a fragment. As shown by reference number 306, if the received traffic is not a fragment (e.g., if the received traffic is a packet), then the network device may determine whether there are any outstanding fragments in-flight. If there are outstanding fragments in-flight, then, as shown by reference numbers 308, 310, and 312, the network device may store the packet temporarily, wait for up to 20 ms for the fragments to clear, and extract a five-tuple from the packet to form a hash key. If there are no outstanding fragments in-flight, then, as shown by reference number 312, the network device may extract the five-tuple from the packet to form the hash key. As shown by reference number 314, the network device may perform a lookup for an SOF session (e.g., using the hash key) and determine whether there is a hash hit. As shown by reference number 316, if there is a hash hit, then the network device (e.g., I/O card) may offload the packet as received. As shown by reference number 318, if there is no hash hit, then the network device may perform a hash lookup to identify, by an SPU identifier, an SPU that is anchoring the session of the packet. As shown by reference number 320, the network device may send the packet to the identified SPU.

With reference to FIG. 3B, as shown by reference number 322, if the received traffic is a fragment (reference number 304 of FIG. 3A), then the network device may have received a fragment of a packet. As shown by reference number 324, the network device may extract a four-tuple from the fragment. As shown by reference number 326, the network device may calculate a hash from the four-tuple. As shown by reference number 328, the network device may perform a lookup for a packet (e.g., using the hash) and determine whether there is a hash hit. As shown by reference number 330, if there is a hash hit, then the network device (e.g., I/O card) may update the relevant hash table with the fragment. As shown by reference number 332, if there is no hash hit, then the network device may create a hash entry and store an indication of the packet. As shown by reference number 334, the network device determines whether all of the fragments of the packet have been received. If all of the fragments of the packet have not been received, then process 300 returns to reference number 322.

With reference to FIG. 3C, as shown by reference number 336, if all of the fragments of the packet have not been received (reference number 334 of FIG. 3B), then the network device may validate fragments received within 20 ms (stale hash table entries may be deleted after 20 ms of the corresponding session being inactive). As shown by reference number 338, the network device may determine whether the validation was successful. As shown by reference numbers 340 and 342, if the validation was not successful, then the network device may drop all of the fragments of the packet and end the process 300. As shown by reference number 344, if the validation was successful, then the network device may extract a five-tuple from the initial fragment and form a hash key for the SOF session. As shown by reference number 346, the network device may perform a lookup for an SOF session (e.g., using the hash key) and determine whether there is a hash hit. As shown by reference numbers 348 and 342, if there is a hash hit, then the network device (e.g., I/O card) may offload all buffered fragments as received and end the process 300. As shown by reference numbers 350, 352, and 342, if there is no hash hit, then the network device may perform a hash lookup to identify, by an SPU identifier, an SPU that is anchoring the SOF session of the packet, send all of the fragments of the packet to the identified SPU, and end the process 300.

As indicated above, FIGS. 3A-3C are provided as an example. Other examples may differ from what is described with regard to FIGS. 3A-3C. The number and arrangement of devices shown in FIGS. 3A-3C are provided as an example. In practice, there may be additional devices, fewer devices, different devices, or differently arranged devices than those shown in FIGS. 3A-3C. Furthermore, two or more devices shown in FIGS. 3A-3C may be implemented within a single device, or a single device shown in FIGS. 3A-3C may be implemented as multiple, distributed devices. Additionally, or alternatively, a set of devices (e.g., one or more devices) shown in FIGS. 3A-3C may perform one or more functions described as being performed by another set of devices shown in FIGS. 3A-3C.

Figure 4:
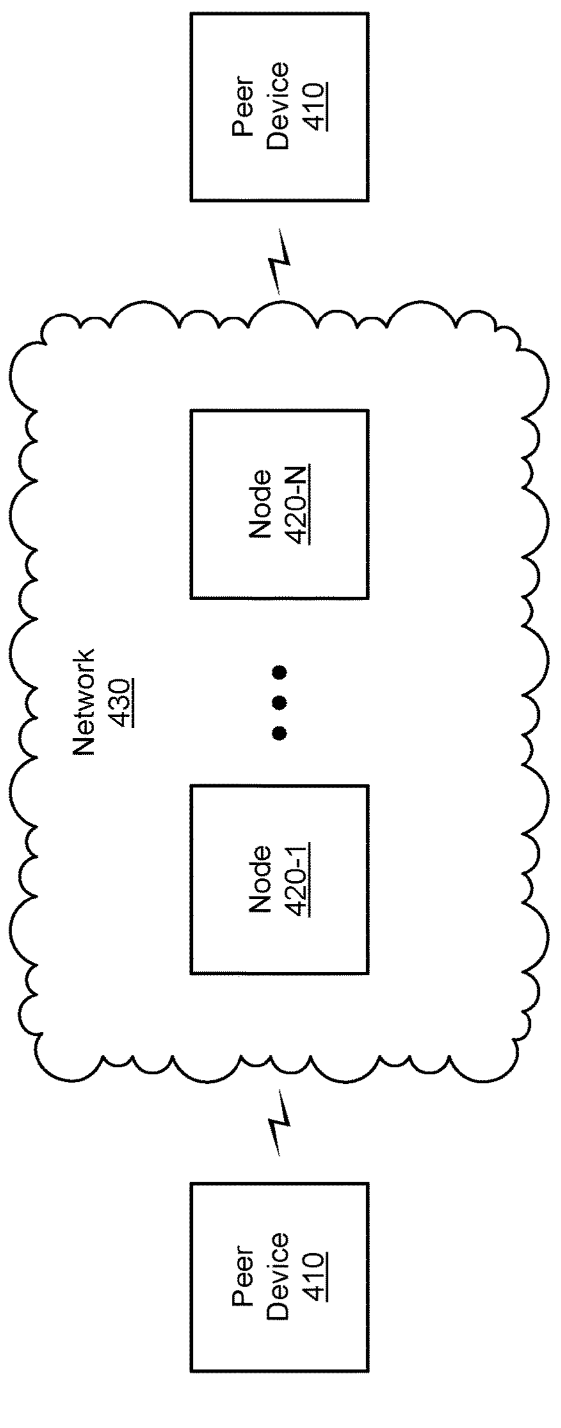
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include one or more peer devices 410, a group of nodes 420 (shown as node 420-1 through node 420-N), and a network 430. Devices of environment 400 may interconnect via wired connections, wireless connections, or a combination of wired and wireless connections.

Peer device 410 includes one or more devices capable of receiving and/or providing network traffic. For example, peer device 410 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. In some implementations, peer device 410 may include an endpoint device that is a source or a destination for network traffic. For example, peer device 410 may include a computer or a similar type of device. Peer device 410 may receive network traffic from and/or may provide network traffic (e.g., payload packets) to other peer devices 410 via network 430 (e.g., by routing payload packets using node(s) 420 as an intermediary). In some implementations, peer device 410 may include an edge device that is located at an edge of one or more networks. For example, peer device 410 receive network traffic from and/or may provide network traffic (e.g., payload packets) to devices external to network 430.

Node 420 includes one or more devices capable of receiving, processing, storing, routing, and/or providing traffic (e.g., a payload packet, a file, etc.) in a manner described herein. For example, node 420 may include a router, such as a label switching router (LSR), a label edge router (LER), an ingress router, an egress router, a provider router (e.g., a provider edge router, a provider core router, etc.), a virtual router, or another type of router. Additionally, or alternatively, node 420 may include a gateway, a switch, a firewall, a hub, a bridge, a reverse proxy, a server (e.g., a proxy server, a cloud server, a data center server, etc.), a load balancer, and/or a similar device.

In some implementations, node 420 may be a physical device implemented within a housing, such as a chassis. In some implementations, node 420 may be a virtual device implemented by one or more computer devices of a cloud computing environment or a data center.

In some implementations, node 420 may be configured with one or more segment translation tables. In some implementations, node 420 may receive a payload packet from peer device 410. In some implementations, node 420 may encapsulate the payload packet using a compressed routing header (CRH) and may route the IP payload packet to another node 420, using one or more techniques described elsewhere herein. In some implementations, node 420 may be an edge node in network 430. In some implementations, node 420 may be an intermediary node in network 430 (i.e., a node between two or more edge nodes).

Network 430 includes one or more wired and/or wireless networks. For example, network 430 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a WAN, a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
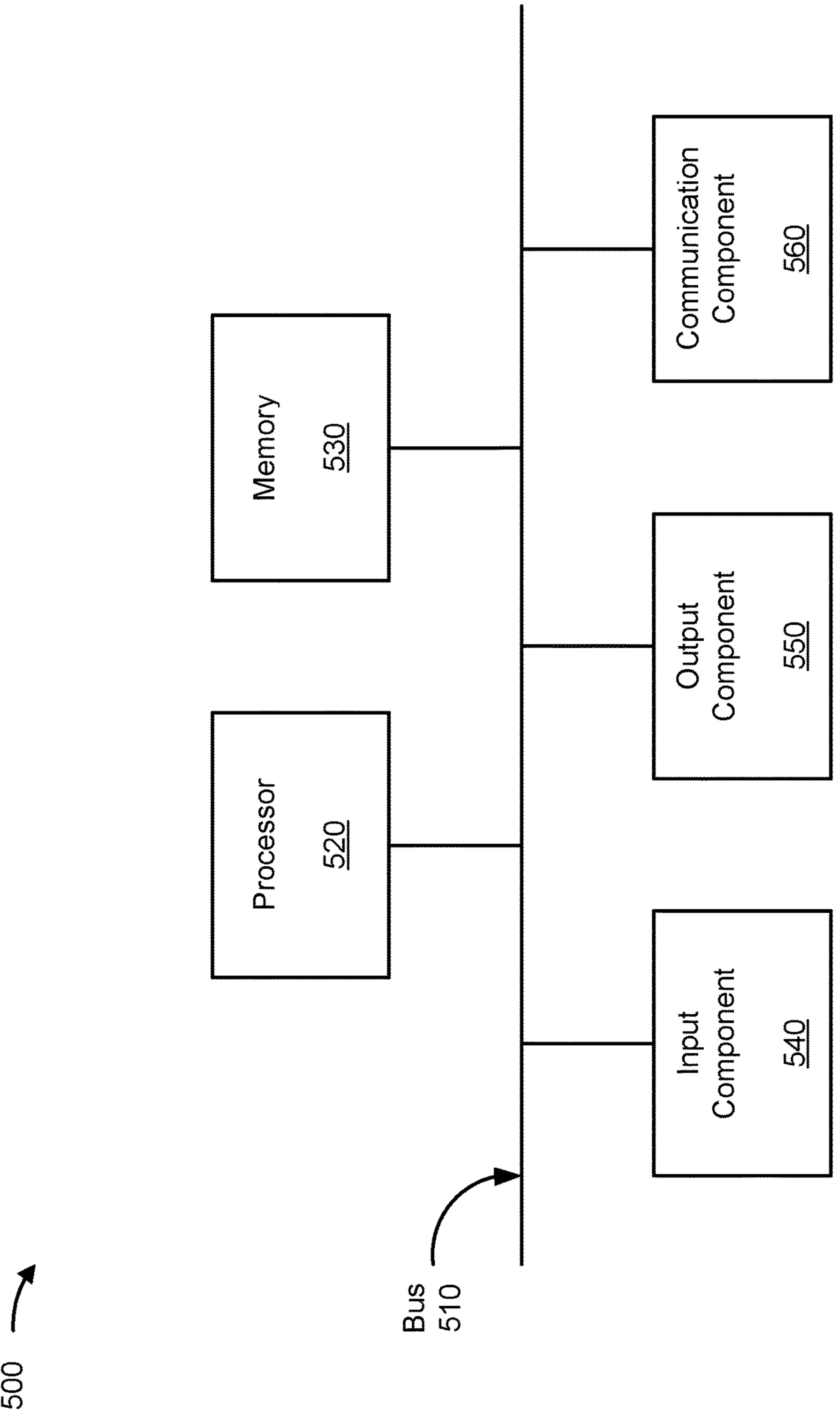
FIG. 5 is a diagram of example components of a device associated with transmission of packet fragments.

FIG. 5 is a diagram of example components of a device 500 associated with transmission of packet fragments. The device 500 may correspond to peer device 410 and/or node 420. In some implementations, peer device 410 and/or node 420 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor

520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
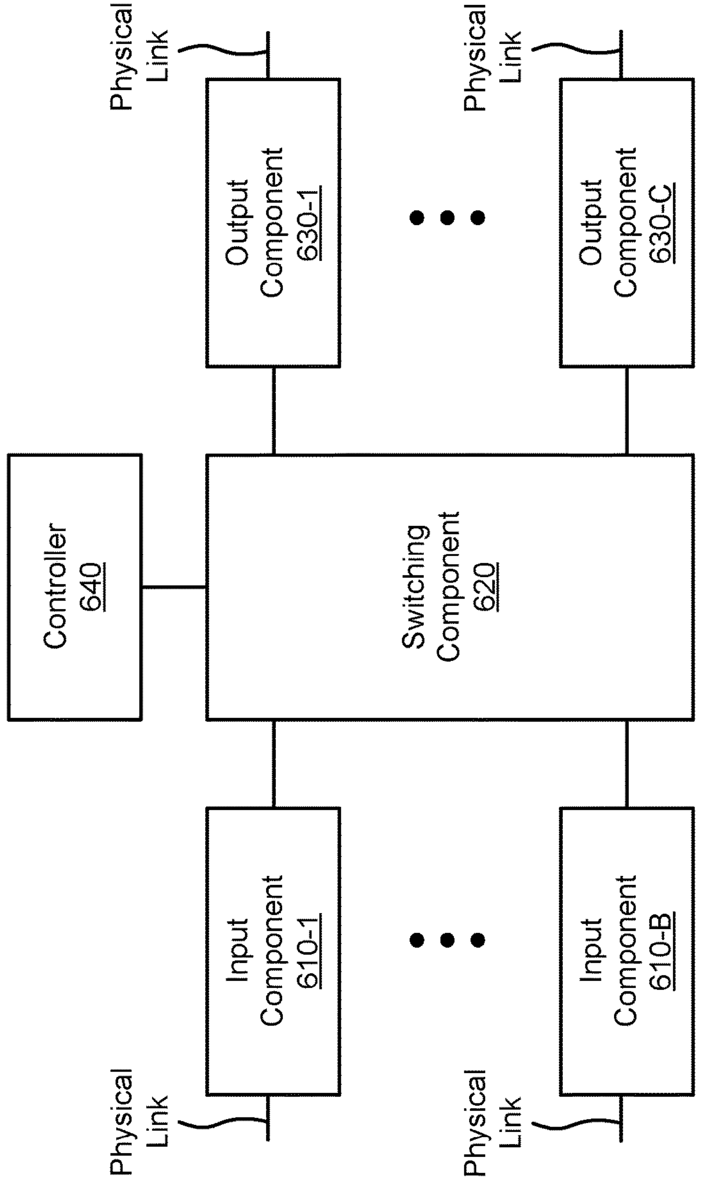
FIG. 6 is a diagram of example components of a device associated with transmission of packet fragments.

FIG. 6 is a diagram of example components of a device 600 associated with transmission of packet fragments. Device 600 may correspond to peer device 410 and/or node 420. In some implementations, peer device 410 and/or node 420 may include one or more devices 600 and/or one or more components of device 600. As shown in FIG. 6, device 600 may include one or more input components 610-1 through 610-B (B ≥1) (hereinafter referred to collectively as input components 610, and individually as input component 610), a switching component 620, one or more output components 630-1 through 630-C (C ≥1) (hereinafter referred to collectively as output components 630, and individually as output component 630), and a controller 640.

Input component 610 may be one or more points of attachment for physical links and may be one or more points of entry for incoming traffic, such as packets. Input component 610 may process incoming traffic, such as by performing data link layer encapsulation or decapsulation. In some implementations, input component 610 may transmit and/or receive packets. In some implementations, input component 610 may include an input line card that includes one or more packet processing components (e.g., in the form of integrated circuits), such as one or more interface cards (IFCs), packet forwarding components, line card controller components, input ports, processors, memories, and/or input queues. In some implementations, device 600 may include one or more input components 610.

Switching component 620 may interconnect input components 610 with output components 630. In some implementations, switching component 620 may be implemented via one or more crossbars, via busses, and/or with shared memories. The shared memories may act as temporary buffers to store packets from input components 610 before the packets are eventually scheduled for delivery to output components 630. In some implementations, switching component 620 may enable input components 610, output components 630, and/or controller 640 to communicate with one another.

Output component 630 may store packets and may schedule packets for transmission on output physical links. Output component 630 may support data link layer encapsulation or decapsulation, and/or a variety of higher-level protocols. In some implementations, output component 630 may transmit packets and/or receive packets. In some implementations, output component 630 may include an output line card that includes one or more packet processing components (e.g., in the form of integrated circuits), such as one or more IFCs, packet forwarding components, line card controller components, output ports, processors, memories, and/or output queues. In some implementations, device 600 may include one or more output components 630. In some implementations, input component 610 and output component 630 may be implemented by the same set of components (e.g., and input/output component may be a combination of input component 610 and output component 630).

Controller 640 includes a processor in the form of, for example, a CPU, a graphics processing unit (GPU), an accelerated processing unit (APU), a microprocessor, a microcontroller, a digital signal processor (DSP), an field-programmable gate array (FPGA), an application-specific integrated circuit (ASIC), and/or another type of processor. The processor is implemented in hardware, firmware, or a combination of hardware and software. In some implementations, controller 640 may include one or more processors that can be programmed to perform a function.

In some implementations, controller 640 may include a RAM, a ROM, and/or another type of dynamic or static storage device (e.g., a flash memory, a magnetic memory, an optical memory, etc.) that stores information and/or instructions for use by controller 640.

In some implementations, controller 640 may communicate with other devices, networks, and/or systems connected to device 600 to exchange information regarding network topology. Controller 640 may create routing tables based on the network topology information, may create forwarding tables based on the routing tables, and may forward the forwarding tables to input components 610 and/or output components 630. Input components 610 and/or output components 630 may use the forwarding tables to perform route lookups for incoming and/or outgoing packets.

Controller 640 may perform one or more processes described herein. Controller 640 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 640 from another computer-readable medium or from another device via a communication interface. When executed, software instructions stored in a memory and/or storage component associated with controller 640 may cause controller 640 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
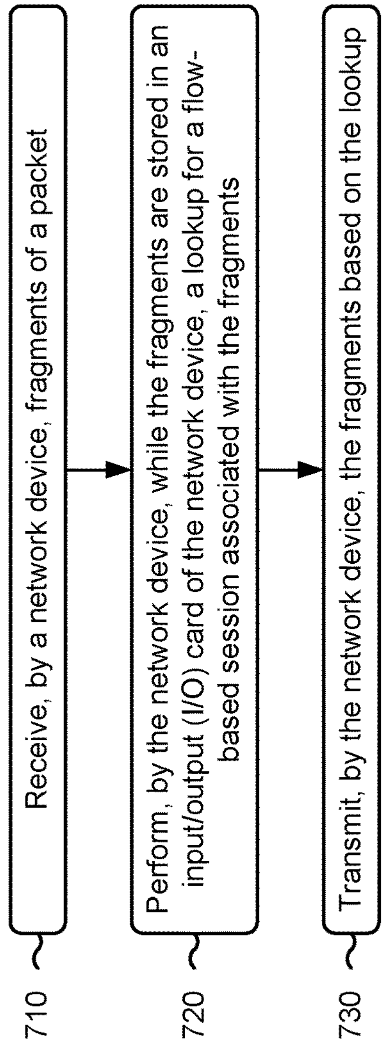
FIG. 7 is a flowchart of an example process associated with transmission of packet fragments.
Figure 7:

FIG. 7 is a flowchart of an example process 700 associated with transmission of packet fragments. In some implementations, one or more process blocks of FIG. 7 are performed by a network device (e.g., the network device of FIG. 1). In some implementations, one or more process blocks of FIG. 7 are performed by another device or a group of devices separate from or including the network device, such as a peer device (e.g., peer device 410) and/or a node (e.g., node 420). Additionally, or alternatively, one or more process blocks of FIG. 7 may be performed by one or more components of device 500, such as processor 520, memory 530, input component 540, output component 550, and/or communication component 560, or by one or more components of device 600, such as input component 610, switching component 620, output component 630, and/or controller 640.

As shown in FIG. 7, process 700 may include receiving fragments of a packet (block 710). For example, the network device may receive fragments of a packet, as described above.

As further shown in FIG. 7, process 700 may include performing, while the fragments are stored in an I/O card of the network device, a lookup for a flow-based session associated with the fragments (block 720). For example, the network device may perform, while the fragments are stored in an I/O card of the network device, a lookup for a flow-based session associated with the fragments, as described above.

As further shown in FIG. 7, process 700 may include transmitting the fragments based on the lookup (block 730). For example, the network device may transmit the fragments based on the lookup, as described above.

Process 700 may include additional implementations, such as any single implementation or any combination of implementations described below and/or in connection with one or more other processes described elsewhere herein.

In a first implementation, process 700 includes identifying, by the network device, the flow-based session, and transmitting the fragments includes forwarding the fragments based on the flow-based session.

In a second implementation, alone or in combination with the first implementation, process 700 includes determining, by the network device, that the fragments are of the packet.

In a third implementation, alone or in combination with one or more of the first and second implementations, determining that the fragments are of the packet includes determining that the fragments are of the packet based on a packet-specific tuple associated with each of the fragments.

In a fourth implementation, alone or in combination with one or more of the first through third implementations, the packet-specific tuple for each fragment includes a source IP address, a destination IP address, an IP identification, and a VRF indication.

In a fifth implementation, alone or in combination with one or more of the first through fourth implementations, process 700 includes storing, by the network device, a hash entry based on the packet-specific tuple, and determining that the fragments are of the packet includes determining that the fragments are of the packet based on the hash entry.

In a sixth implementation, alone or in combination with one or more of the first through fifth implementations, process 700 includes deleting, by the network device, the hash entry in response to transmitting the fragments.

In a seventh implementation, alone or in combination with one or more of the first through sixth implementations, process 700 includes determining, by the network device, that the fragments are associated with the flow-based session.

In an eighth implementation, alone or in combination with one or more of the first through seventh implementations, determining that the fragments are associated with the flow-based session includes determining that the fragments are associated with the flow-based session based on a per-flow tuple associated with the packet.

In a ninth implementation, alone or in combination with one or more of the first through eighth implementations, determining that the fragments are associated with the flow-based session includes identifying information associated with the flow-based session in an initial fragment of the fragments.

In a tenth implementation, alone or in combination with one or more of the first through ninth implementations, process 700 includes generating, by the network device, a hash based on the per-flow tuple, and performing the lookup includes performing the lookup based on the hash.

In an eleventh implementation, alone or in combination with one or more of the first through tenth implementations, performing the lookup includes performing the lookup based on a time window.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by a network device, fragments of a packet;

performing, by the network device, while the fragments are stored in an input/output (I/O) card of the network device, a lookup for a flow-based session associated with the fragments based on a per-flow tuple associated with the packet, wherein the per-flow tuple is obtained from an initial fragment of the packet; and transmitting, by the network device, the fragments based on the lookup.

2. The method of claim 1, further comprising:

identifying, by the network device, the flow-based session, wherein transmitting the fragments includes forwarding the fragments based on the flow-based session.

3. The method of claim 1, further comprising:

determining, by the network device, that the fragments are of the packet.

4. The method of claim 3, wherein determining that the fragments are of the packet includes determining that the fragments are of the packet based on a packet-specific tuple associated with each of the fragments.

5. The method of claim 4, wherein the packet-specific tuple for each fragment includes a source internet protocol (IP) address, a destination IP address, an IP identification, and a virtual routing and forwarding (VRF) indication.

6. The method of claim 4, further comprising:

storing, by the network device, a hash entry based on the packet-specific tuple, wherein determining that the fragments are of the packet includes determining that the fragments are of the packet based on the hash entry.

7. The method of claim 6, further comprising:

deleting, by the network device, the hash entry in response to transmitting the fragments.

8. The method of claim 1, further comprising:

determining, by the network device, that the fragments are associated with the flow-based session.

9. The method of claim 1, further comprising:

generating, by the network device, a hash based on the per-flow tuple, wherein performing the lookup includes performing the lookup based on the hash.

10. The method of claim 1, wherein performing the lookup includes performing the lookup based on a time window.

11. The method of claim 1, wherein the per-flow tuple associated with the packet includes a source Internet Protocol (IP) address, a destination IP address, a protocol of the packet, a source port of the packet, and a destination port of the packet.

12. A network device, comprising:

one or more memories; and one or more processors to:

receive fragments of a packet;

determine, based on a packet-specific tuple associated with each of the fragments, that the fragments are of the packet;

determine, based on a per-flow tuple in an initial fragment of the packet, that the fragments are associated with a flow-based session; and transmit the fragments based on the flow-based session.

13. The network device of claim 12, wherein the one or more processors are further to:

perform, while the fragments are stored in an I/O card of the network device, a lookup for a flow-based session associated with the fragments.

14. The network device of claim 12, wherein the one or more processors are further to:

store a hash entry based on the packet-specific tuple, wherein the one or more processors, to determine that the fragments are of the packet, are to determine that the fragments are of the packet based on the hash entry.

15. The network device of claim 12, wherein the packet-specific tuple for each fragment includes a source internet protocol (IP) address, a destination IP address, an IP identification, and a virtual routing and forwarding (VRF) indication.

16. A non-transitory computer-readable medium storing a set of instructions, the set of instructions comprising:

one or more instructions that, when executed by one or more processors of a network device, cause the network device to:

receive fragments of a packet;

perform, while the fragments are stored in an input/output (I/O) card of the network device, a lookup for a flow-based session associated with the fragments based on a per-flow tuple associated with the packet, wherein the per-flow tuple is obtained from an initial fragment of the packet; and transmit the fragments based on the lookup.

17. The non-transitory computer-readable medium of claim 16, wherein the one or more instructions further cause the network device to:

identify the flow-based session, wherein the one or more instructions that cause the network device to transmit the fragments include the one or more instructions that cause the network device to forward the fragments based on the flow-based session.

18. The non-transitory computer-readable medium of claim 16, wherein the one or more instructions further cause the network device to:

determine that the fragments are associated with the flow-based session.

19. The non-transitory computer-readable medium of claim 16, wherein the one or more instructions that cause the network device to perform the lookup include one or more instructions that cause the network device to perform the lookup based on a time window.

20. The non-transitory computer-readable medium of claim 16, wherein the per-flow tuple associated with the packet includes a source Internet Protocol (IP) address, a destination IP address, a protocol of the packet, a source port of the packet, and a destination port of the packet.

* * * * *